(12) United States Patent
Zhang et al.

(10) Patent No.: US 12,379,872 B2
(45) Date of Patent: Aug. 5, 2025

(54) PROGRAM DETECTION METHOD AND APPARATUS

(71) Applicant: Huawei Technologies Co., Ltd., Shenzhen (CN)

(72) Inventors: Rutao Zhang, Shanghai (CN); Qing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 18/342,388

(22) Filed: Jun. 27, 2023

(65) Prior Publication Data

US 2023/0367516 A1 Nov. 16, 2023

Related U.S. Application Data

(63) Continuation of application No. PCT/CN2021/123936, filed on Oct. 14, 2021.

(30) Foreign Application Priority Data

Dec. 29, 2020 (CN) .......................... 202011608587.6

(51) Int. Cl.
*G06F 3/06* (2006.01)
*G06F 8/41* (2018.01)
*G06F 9/46* (2006.01)
*G06F 11/362* (2025.01)

(52) U.S. Cl.
CPC .......... *G06F 3/0659* (2013.01); *G06F 3/0604* (2013.01); *G06F 3/0673* (2013.01); *G06F 8/433* (2013.01); *G06F 9/467* (2013.01); *G06F 11/3632* (2013.01)

(58) Field of Classification Search
CPC .... G06F 3/0604; G06F 3/0659; G06F 3/0673; G06F 8/433; G06F 9/467; G06F 11/3632
USPC .................................................. 717/126–127
See application file for complete search history.

(56) References Cited

U.S. PATENT DOCUMENTS

| | | | | |
|---|---|---|---|---|
| 5,758,051 | A | * | 5/1998 | Moreno ................ G06F 9/3834 714/50 |
| 5,872,990 | A | | 2/1999 | Luick et al. |
| 8,510,604 | B2 | * | 8/2013 | Eilebrecht ........... G06F 11/3604 714/25 |
| 8,813,038 | B2 | * | 8/2014 | Erickson ............. G06F 11/3636 717/124 |

(Continued)

FOREIGN PATENT DOCUMENTS

| | | |
|---|---|---|
| CN | 101939724 A | 1/2011 |
| CN | 104050043 A | 9/2014 |

(Continued)

OTHER PUBLICATIONS

Manson et al., "The Java Memory Model", 2005, ACM, 14 pages. (Year: 2005).*

(Continued)

*Primary Examiner* — Ted T. Vo
(74) *Attorney, Agent, or Firm* — Conley Rose, P.C.

(57) ABSTRACT

A program detection method includes receiving a program provided by a user, and obtaining, based on a query parameter and the program, a result of the program running in a weak memory environment. The query parameter indicates a maximum interval between two operations on which reordering occurs and that are of the program.

20 Claims, 12 Drawing Sheets

S101: Receive a program provided by a user

S102: Obtain, based on a query parameter and the program, a result of the program running in a weak memory environment

(56) References Cited

U.S. PATENT DOCUMENTS

| | | | |
|---|---|---|---|
| 9,432,298 B1* | 8/2016 | Smith | H04L 49/9057 |
| 10,445,094 B2* | 10/2019 | Beard | G06F 12/084 |
| 2006/0161897 A1* | 7/2006 | Biberstein | G06F 11/3684 |
| | | | 717/124 |

FOREIGN PATENT DOCUMENTS

| | | |
|---|---|---|
| CN | 104137081 A | 11/2014 |
| CN | 106201889 A | 12/2016 |
| CN | 107861830 A | 3/2018 |

OTHER PUBLICATIONS

Herb Sutter, ""Strong" and "weak" hardware memory models", 2012, retrieved from https://herbsutter.com/2012/08/02/strong-and-weak-hardware-memory-models/, 1 page. (Year: 2012).*

Jeff Preshing, "Deep Graph Matching and Searching for Semantic Code Retrieval", 2019, https://web.archive.org/web/20190824043640/https://preshing.com/20120515/memory-reordering-caught-in-the-act/, 15 pages. (Year: 2019).*

Nadesh Ramanathan, "Global Analysis of C Concurrency in High-Level Synthesis," 27th International Conference on Intelligent User Interfaces, Oct. 29, 2013, 14 pages.

Brian Norris, et al., "CDSCHECKER: Checking Concurrent Data Structures Written with C/C++ Atomics" OOPSLA, Oct. 29-31, 2013, 19 pages.

Herb Sutter, "Strong" and "weak" hardware memory models, Sutter's Mill, Aug. 2, 2012, 1 pages.

* cited by examiner

| *Select a program | Select a program file ▽ | |
|---|---|---|
| *Query parameter | Enter a type of the query parameter | Enter a numeric value |
| | Enter a type of the query parameter | Enter a numeric value |
| | Enter a type of the query parameter | Enter a numeric value |

Submit    Cancel (A)

| *Select a program | Select a program file ▽ | |
|---|---|---|
| *Query parameter | ☐ On-chip write operation delay | Enter a numeric value |
| | ☐ Cross-NUMA write operation delay | Enter a numeric value |
| | ☐ Cross-NUMA read operation delay | Enter a numeric value |

Submit    Cancel (B)

FIG. 5

```
1  #include <pthread.h>
2  #include <stdlib.h>
3  #include <stdio.h>
4  #define true 1
5  #define false 0
6
7  struct city {
8          int population
9          int syn_flag
10 };
11
12 struct City *my_city
13
14 void *thread1(void *arg){
15         printf ("hello\n");
16
17         my_city->population = 3000;//w
18         my_city->syn_flag = true;
19
20 }
21  viod *thread2(void *arg){
22         printf("world!\n");
23         while(my_city->syn_flag = = false);
24         printf("the population of beijing is  zd\n",my_city->population);
25 }
26 int main(){
27            pthread_t tid1,tid2:
28
29            struct City Beijing;
30            BeiJing.syn_fiag=false;//init
31            BeiJing.Population=0;//init
32            my_city=&BeiJing;
33
34            pthread_create(&tid1,NULL,thread1,NULL);
35            pthread_create(&tid2,NULL,thread2,NULL);
36            pthread_join(tid1,NULL);
```

FIG. 6

```
*****************************************************************
** Note1: ST means Static thread.
** Note2: We precisely record the call string of each variable.
** Note3: The style of call sting is A(b)->C(d)->....,A means caller, b meas call instruction.
** Note4: A(b)->C means that A calls C by instruction b.
*****************************************************************
    Pairs is::
        Call_string is: ST 1::main(0×3913f00)->thread1::Variable "Population"(weakConsisten
cy.c:17:22)
        Call_string is: ST 2::main(0×3914888)->thread2::Variable "Population"(weakConsisten
cy.c:24:55)
    Pairs is::
        Call_string is: ST 1::main(0×3913f00)->thread1::Variable "syn_flag"(weakConsistency.
c:18:20)
        Call_string is: ST 2::main(0×3914000)->thread2::Variable "syn_flag"(weakConsistency.
c:23:17)
********************         End analysis         ***************************
This analysis time cost:260320us.
[root0localhost cgo2818_MHP_SUC]#
```

FIG. 9

PROGRAM DETECTION METHOD AND APPARATUS

CROSS-REFERENCE TO RELATED APPLICATIONS

This is a continuation of International Patent Application No. PCT/CN2021/123936 filed on Oct. 14, 2021, which claims priority to Chinese Patent Application No. 202011608587.6 filed on Dec. 29, 2020. The disclosures of the aforementioned applications are hereby incorporated by reference in their entireties.

TECHNICAL FIELD

This application relates to the communication field, and in particular, to a program detection method and apparatus.

BACKGROUND

A strong memory model and a weak memory model are two types of storage models. The strong memory model describes that each instruction implies acquire and release semantics. The acquire semantics may be used to prevent out-of-order of read-acquire and any read or write operation after the read-acquire. The release semantics may be used to prevent out-of-order of write-release and any read or write operation before the write-release. In other words, an order of write operations performed by one core on a memory may be observed in the same order by another core in a central processing unit (CPU). The weak memory model describes that within an independent thread, any read or write operation on a memory can swap the order with another read or write operation without changing behavior of the thread.

Due to the lag of a software ecological environment of the weak memory model, after a program developed based on a strong memory model platform is ported to a weak memory model platform, exceptions such as a program crash, restart, or an incorrect calculation result may occur. Therefore, it is necessary to test and debug the program repeatedly by experienced program developers to analyze whether the exceptions occur when the program runs on the weak memory model platform. However, a probability of reproducing the exceptions such as a program crash, restart, or an incorrect calculation result is low, and limited by test cases and test environments, costs of reproducing a problem are high, and requirements on professional capabilities of testers are very high.

SUMMARY

Embodiments of this application provide a program detection method and apparatus, which can help a user quickly complete a check on a program running on a weak memory model platform, and can improve program detection efficiency.

To achieve the foregoing objective, this application uses the following technical solutions.

According to a first aspect, a program detection method is provided. The program detection method includes receiving a program provided by a user; and obtaining, based on a query parameter and the program, a result of the program running in a weak memory environment. The query parameter indicates a maximum interval between two operations on which reordering occurs and that are of the program.

Based on the program detection method according to the first aspect, a program detection apparatus receives the program provided by the user, and may obtain, based on the program and the query parameter that indicates the maximum interval between the two operations on which reordering occurs and that are of the program, the result of the program running in the weak memory environment. This can help the user quickly complete a check on the program running in the weak memory environment, can improve program detection efficiency, and has low requirements on professional capabilities of the user.

In a possible design solution, obtaining, based on a query parameter and the program, a result of the program running in a weak memory environment may include obtaining, based on the query parameter, an interval between a first operation in a first thread of the program and a second operation in the first thread, and an interval between a third operation in a second thread of the program and a fourth operation in the second thread, the result of the program running in the weak memory environment. Optionally, the first operation and the third operation may be a pair of read and write operations performed on a same variable, the second operation and the fourth operation may be a pair of read and write operations performed on a same variable, the first operation and the second operation are operations performed on different variables, and the third operation and the fourth operation are operations performed on different variables. In this way, the user does not need to test the program, and the program detection efficiency can be improved.

In a possible design manner, the program detection method according to the first aspect may further include detecting, by using a memory read/write mode query rule, the first operation in the first thread of the program, the second operation in the first thread, the third operation in the second thread of the program, and the fourth operation in the second thread to obtain the result of the program running in the weak memory environment.

Optionally, the memory read/write mode query rule may be determined based on the query parameter, and the memory read/write mode query rule may be used to determine whether the first thread and the second thread overlap in terms of time. In this way, if the program meets the memory read/write mode query rule, the result is an error. For example, a weak memory order problem is prone to occur. If the program does not meet the memory read/write mode query rule, the result is correct. For example, if a result of the program running on a weak memory model platform is correct, the user does not need to repeatedly test the program, and the result of the program running in the weak memory environment can be quickly obtained.

Optionally, the memory read/write mode query rule may include a read-read and write-write out-of-order query rule, and/or a read-write and write-read out-of-order query rule. In this way, a result of a program that runs in the weak memory environment and that includes at least two threads can be detected, where one thread includes read-read operations, and the other thread includes write-write operations; and/or a result of a program that runs in the weak memory environment and that includes at least two threads can be detected, where one thread includes read-write operations, and the other thread includes write-read operations.

In a possible design manner, the query parameter may be determined by the user, and the query parameter may include an on-chip write operation delay. Optionally, the query parameter may further include a cross-non-uniform memory access architecture (NUMA) write operation delay and/or a cross-NUMA read operation delay. In this way, memory read/write mode query may be performed based on the query parameter entered by the user.

In a possible design manner, the program detection method according to the first aspect may further include obtaining a numeric value corresponding to the query parameter. The numeric value corresponding to the query parameter may include a value corresponding to the on-chip write operation delay. Optionally, the numeric value corresponding to the query parameter may further include a value corresponding to the cross-NUMA write operation delay and/or a value corresponding to the cross-NUMA read operation delay.

Optionally, the weak memory environment may be a running environment corresponding to a running device in a NUMA.

In a possible design manner, the program detection method according to the first aspect may further include providing the result for the user. The result may include a modification suggestion. In this way, the user may manually modify the program according to the modification suggestion such that the user can quickly locate a location that causes a program error in the program, quickly complete program modification, and improve program modification efficiency.

Optionally, the result may include correct. Alternatively, the result may include an error and/or the modification suggestion.

Optionally, the modification suggestion may include location information of code that needs to be modified, for example, a code line number and/or a program file name. The modification suggestion may be used by the program detection apparatus to modify the program, or may be used by the user to manually modify the program.

In a possible design manner, the program detection method according to the first aspect may further include modifying the program according to the modification suggestion in response to a determining indication of the user. This can directly help the user complete a modification on the program, and further improve the program modification efficiency.

According to a second aspect, a program detection apparatus is provided. The program detection apparatus includes a receiving unit and an obtaining unit. The receiving unit is configured to receive a program provided by a user. The obtaining unit is configured to obtain, based on a query parameter and the program, a result of the program running in a weak memory environment. The query parameter indicates a maximum interval between two operations on which reordering occurs and that are of the program.

In a possible design manner, the obtaining unit is further configured to obtain, based on the query parameter, an interval between a first operation in a first thread of the program and a second operation in the first thread, and an interval between a third operation in a second thread of the program and a fourth operation in the second thread, the result of the program running in the weak memory environment. Optionally, the first operation and the third operation are a pair of read and write operations performed on a same variable, the second operation and the fourth operation are a pair of read and write operations performed on a same variable, the first operation and the second operation are operations performed on different variables, and the third operation and the fourth operation are operations performed on different variables.

In a possible design manner, the obtaining unit is further configured to detect, by using a memory read/write mode query rule, a first operation in a first thread of the program, a second operation in the first thread, a third operation in a second thread of the program, and a fourth operation in the second thread, to obtain the result of the program running in the weak memory environment.

Optionally, the memory read/write mode query rule may be determined based on the query parameter, and the memory read/write mode query rule may be used to determine whether the first thread and the second thread overlap in terms of time.

In a possible design manner, the memory read/write mode query rule may include a read-read and write-write out-of-order query rule, and/or a read-write and write-read out-of-order query rule.

In a possible design manner, the query parameter may be determined by the user, and the query parameter may include an on-chip write operation delay. Optionally, the query parameter may further include a cross-NUMA write operation delay and/or a cross-NUMA read operation delay. In this way, memory read/write mode query may be performed based on the query parameter entered by the user.

In a possible design manner, the obtaining unit is further configured to obtain a numeric value corresponding to the query parameter. The numeric value corresponding to the query parameter may include a value corresponding to the on-chip write operation delay. Optionally, the numeric value corresponding to the query parameter may further include a value corresponding to the cross-NUMA write operation delay and/or a value corresponding to the cross-NUMA read operation delay.

Optionally, the weak memory environment may be a running environment corresponding to a running device in a NUMA.

In a possible design manner, the program detection apparatus according to the second aspect may further include an output unit. The output unit is configured to provide the result for the user. The result may include a modification suggestion.

Optionally, the result may include correct. Alternatively, the result may include error and/or the modification suggestion.

Optionally, the modification suggestion may include location information of code that needs to be modified, for example, a code line number and/or a program file name. The modification suggestion may be used by the program detection apparatus to modify the program, or may be used by the user to manually modify the program.

In a possible design manner, the obtaining unit is further configured to modify the program according to the modification suggestion in response to a determining instruction of the user.

In a possible design manner, the program detection apparatus may be placed in a cloud server.

It should be noted that the receiving unit and the output unit may be disposed separately, or may be integrated into one module, namely, a transceiver module. A specific implementation of the receiving unit and the output unit is not specifically limited in this application.

Optionally, the program detection apparatus according to the second aspect may further include a storage module, and the storage module stores a program or instructions. When the obtaining unit executes the program or the instructions, the program detection apparatus is enabled to perform the program detection method according to any possible implementation of the first aspect.

It should be noted that the program detection apparatus according to the second aspect may be a computer device, a server, or a cloud server, or may be a chip (system) or another component or assembly that may be disposed in a computer device, a server, or a cloud server. This is not limited in this application.

In addition, for technical effects of the program detection apparatus according to the second aspect, refer to the technical effects of the program detection method according to the first aspect. Details are not described herein again.

According to a third aspect, a program detection apparatus is provided. The program detection apparatus includes a processor. The processor is coupled to a memory. The memory is configured to store a computer program. The processor is configured to execute the computer program stored in the memory, so that the program detection apparatus performs the program detection method according to any possible implementations of the first aspect.

In a possible design, the program detection apparatus according to the third aspect may further include a transceiver. The transceiver may be a transceiver circuit or an input/output port. The transceiver may be used by the program detection apparatus to communicate with another device.

In this application, the program detection apparatus according to the third aspect may be a computer device, a server, or a cloud server, or may be a chip or a chip system disposed inside a computer device, a server, or a cloud server.

In addition, for technical effects of the program detection apparatus according to the third aspect, refer to the technical effects of the program detection method according to any implementation of the first aspect. Details are not described herein again.

According to a fourth aspect, a chip system is provided. The chip system has a weak memory environment. The chip system includes a processor and an input/output port. The processor is coupled to a memory including instructions, and is configured to control the chip system to implement a processing function in any implementation of the first aspect. The input/output port is configured to implement a transceiver function in any implementation of the first aspect.

In a possible design, the chip system further includes a memory, and the memory is configured to store program instructions and data for implementing the functions according to the first aspect.

The chip system may include a chip, or may include a chip and another discrete component.

According to a fifth aspect, a computer-readable storage medium is provided. The computer-readable storage medium stores computer instructions. When the computer instructions are run on a computer, the computer is enabled to perform the program detection method according to any possible implementation of the first aspect.

According to a sixth aspect, a computer program product including instructions is provided. The computer program product includes a computer program or instructions. When the computer program or the instructions are run on a computer, the computer is enabled to perform the program detection method according to any possible implementation of the first aspect.

BRIEF DESCRIPTION OF DRAWINGS

FIG. 5 is a schematic diagram 1 of an interface of a program detection apparatus according to an embodiment of this application;

FIG. 6 is a schematic diagram of an example of a program according to an embodiment of this application;

FIG. 9 is a schematic diagram 2 of an analysis example of a program according to an embodiment of this application;

DESCRIPTION OF EMBODIMENTS

Figure 1:
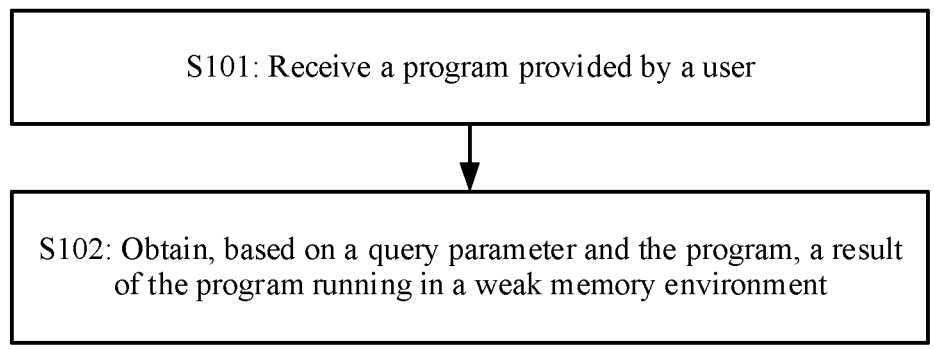
FIG. 1 is a schematic flowchart 1 of a program detection method according to an embodiment of this application.

The following describes technical solutions of this application with reference to accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design solution described as an "example" in this application should not be explained as being more preferred or having more advantages than another embodiment or design solution. Specifically, the term "example" is used to present a concept in a specific manner.

In embodiments of this application, terms "operation instruction" and "operation" may be interchangeably used sometimes. It should be noted that meanings expressed by the terms are consistent when a difference between the terms is not emphasized. Terms "sentence", "program sentence", and "code" may be interchangeably used sometimes. It should be noted that meanings expressed by the terms are consistent when a difference between the terms is not emphasized.

In the descriptions of this application, unless otherwise specified, "a plurality of" means two or more than two. A term "and/or" in this specification describes only an association relationship between associated objects and indicates that there may be three relationships. For example, A and/or B may represent the following three cases: Only A exists, both A and B exist, and only B exists.

For ease of understanding, the following first describes related terms and concepts that may be used in embodiments of this application.

(1) Total Store Ordering (TSO) Consistency Model

The TSO consistency model describes that a plurality of cores in a CPU have only one global order of write operations on a memory. The TSO consistency model belongs to a strong memory model.

Embodiments of this application provide a program detection method, which can be used to detect correctness of a program running on a weak memory model platform, for example, correctness of a program running on an advanced reduced instruction set machine (ARM) platform. The program detection method may be used independently, or may be integrated with third-party software for use. A program detection apparatus according to embodiments of this application may be a computer device, a server, a cloud server, or the like, or may be a chip or another component with a program detection function that is applied to a computer device, a server, or a cloud server.

The following describes in detail the program detection method according to embodiments of this application with reference to FIG. 1 to FIG. 10.

FIG. 1 is a schematic flowchart 1 of a program detection method according to an embodiment of this application. The program detection method according to this embodiment of this application may be used to check software developed in a compiled language, for example, a C language or a C++ language.

As shown in FIG. 1, the program detection method includes the following steps.

S101: Receive a program provided by a user.

Figure 2:
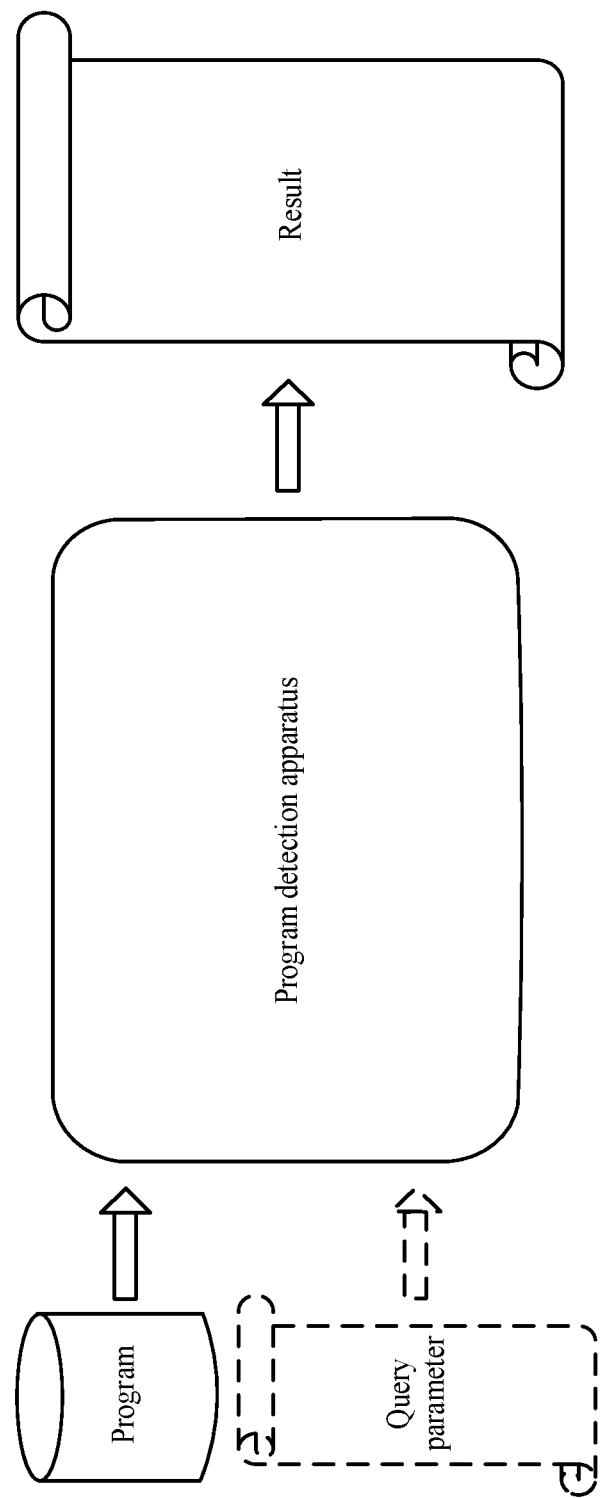
FIG. 2 is a schematic diagram 1 of application of a program detection method according to an embodiment of this application.

FIG. 2 is a schematic diagram 1 of application of a program detection method according to an embodiment of this application.

As shown in FIG. 2, a program detection apparatus receives a program provided by a user. C/C++ software is used as an example, and the program may be C/C++ software source code. The program may include one or more threads.

Optionally, the program detection method according to this embodiment of this application may include converting the program provided by the user into intermediate representation (IR) by using a compiler.

A Clang/LLVM compiler is used as an example. It is assumed that the program provided by the user is XXX.c, and the program is compiled by using the Clang/LLVM compiler, to generate the intermediate representation such as clang-emit-llvm-c-g XXX.c-o XXX.bc. Optionally, an intermediate file XXX.bc of the program is analyzed by using a program detection apparatus Weakmemcheck.

Figure 3A:
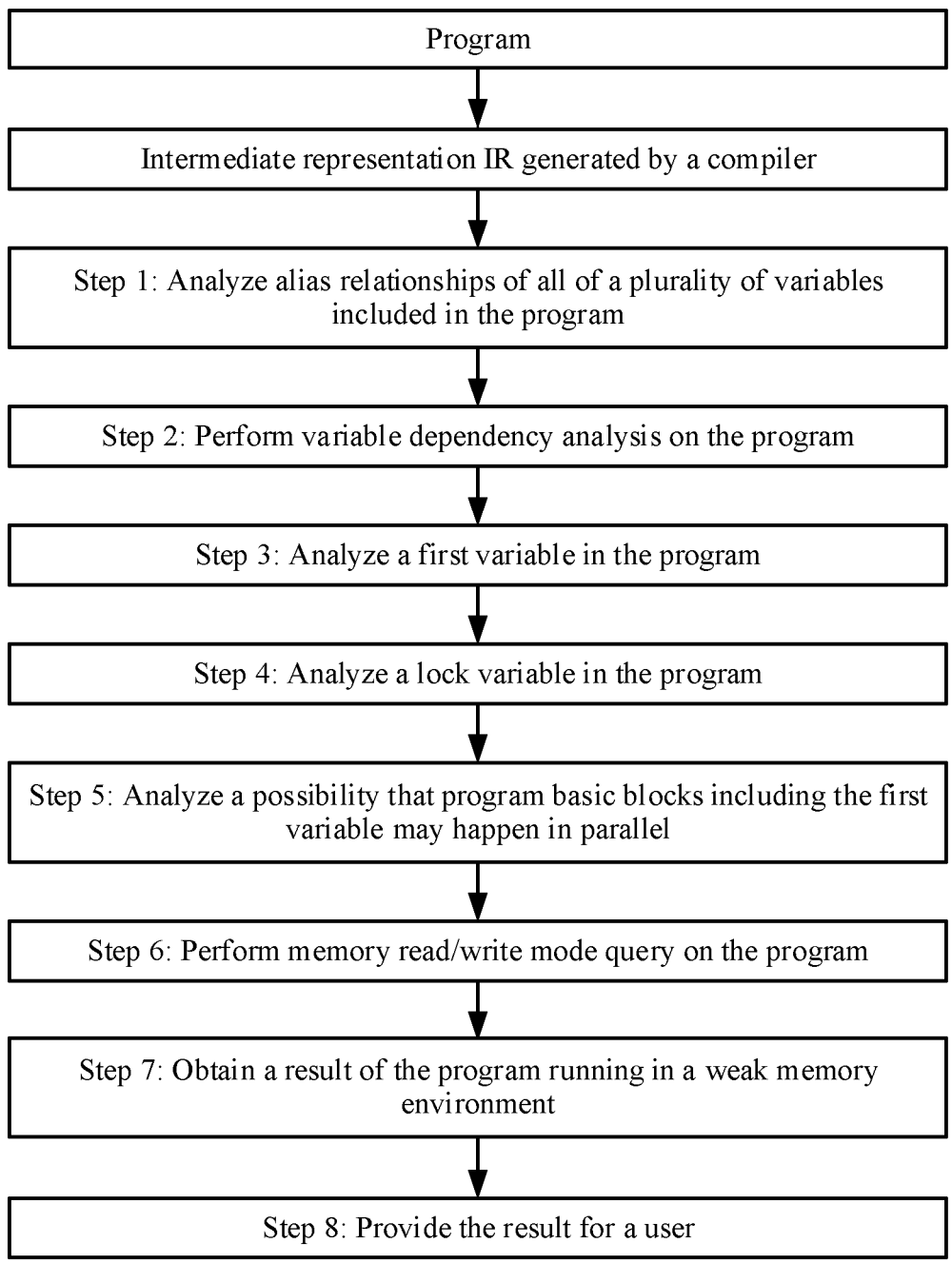
FIG. 3A and FIG. 3B are a schematic flowchart 2 of a program detection method according to an embodiment of this application.
Figure 3B:
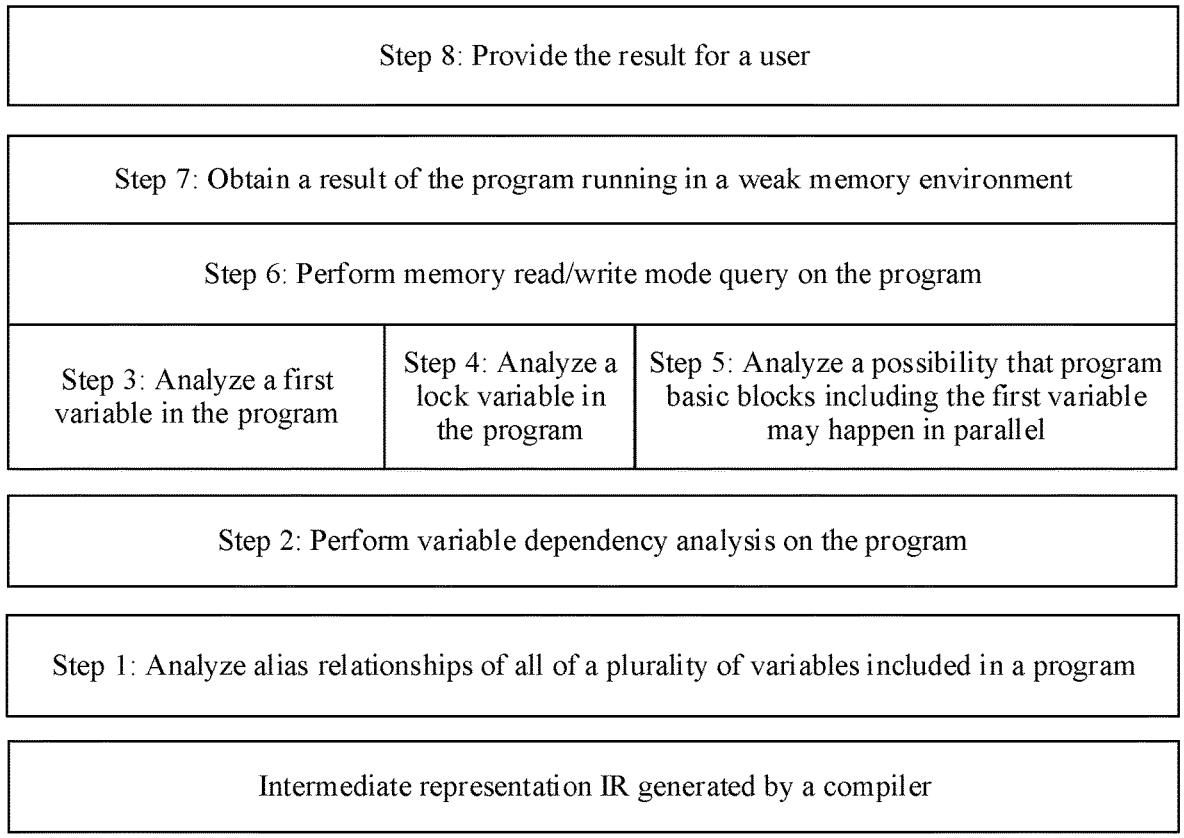

With reference to FIG. 3A or FIG. 3B, the program provided by the user is compiled by using the compiler to generate the intermediate representation IR, and the program detection apparatus analyzes the intermediate representation such that static analysis can be performed on source code without running the program provided by the user. Therefore, there is no intrusion to user software, the security of the program provided by the user can be ensured, and operations are convenient.

S102: Obtain, based on a query parameter and the program, a result of the program running in a weak memory environment.

Optionally, the weak memory environment is a running environment corresponding to a running device of a NUMA.

For example, the weak memory environment may be a running environment of a weak memory model device, a weak memory model platform, or the like.

For example, the query parameter indicates a maximum interval between two operations on which reordering occurs and that are of the program. Optionally, the query parameter may include a type of the query parameter and/or a numeric value corresponding to the query parameter.

In some embodiments, the type of the query parameter may include an on-chip write operation delay. For example, the on-chip write operation delay may be used to indicate a maximum interval between two on-chip store instructions on which reordering occurs.

For example, a memory instruction may be used to store data in a register to a memory, and the on-chip write operation delay may be used to detect whether reordering occurs on two or more store instructions in a NUMA node. For the NUMA node, refer to the following detailed description of FIG. 4.

Optionally, the type of the query parameter may further include a cross-NUMA write operation delay and/or a cross-NUMA read operation delay. For example, the cross-NUMA write operation delay may be used to indicate a maximum interval between two cross-NUMA node store instructions on which reordering occurs, and the cross-NUMA read operation delay may be used to indicate a maximum interval between two cross-NUMA node load instructions on which reordering occurs. A cross-NUMA node instruction is an instruction in which processing in a NUMA node is performed by accessing a memory of another NUMA node.

For example, a load instruction may be used to read data from a memory and put the data into a register. The cross-NUMA write operation delay may be used to detect whether reordering occurs on two or more store instructions between two or more NUMA nodes. The cross-NUMA read operation delay may be used to detect whether reordering occurs on two or more load instructions between two or more NUMA nodes. For the cross-NUMA write operation delay and the cross-NUMA read operation delay, refer to the following detailed description of FIG. 4.

In some embodiments, the numeric value corresponding to the query parameter may include a value corresponding to the on-chip write operation delay.

For example, it is assumed that the value corresponding to the on-chip write operation delay is set to 8, and a maximum interval between two store instructions on which reordering occurs is eight memory operation instructions. To be specific, if an interval between two store instructions is less than or equal to eight memory operation instructions, it is considered that reordering occurs on the two store instructions. Alternatively, if an interval between two store instructions is greater than eight memory operation instructions, it is considered that reordering does not occur on the two store instructions. The memory operation instruction may include a store instruction and/or a load instruction.

Optionally, the numeric value corresponding to the query parameter may further include a value corresponding to the cross-NUMA write operation delay and/or a value corresponding to the cross-NUMA read operation delay.

For example, it is assumed that the value corresponding to the cross-NUMA write operation delay is set to 8, and a maximum interval between two store instructions on which reordering occurs is eight memory operation instructions. To be specific, if an interval between two store instructions is less than or equal to eight memory operation instructions, it is considered that reordering occurs on the two store instructions. Alternatively, if an interval between two store instructions is greater than eight memory operation instructions, it is considered that reordering does not occur on the two store instructions.

Similarly, it is assumed that the value corresponding to the cross-NUMA read operation delay is set to 8, and a maximum interval between two load instructions on which reordering occurs is eight memory operation instructions. To be specific, if an interval between two load instructions is less than or equal to eight memory operation instructions, it is considered that reordering occurs on the two load instructions. Alternatively, if an interval between two load instructions is greater than eight memory operation instructions, it is considered that reordering does not occur on the two load instructions.

Optionally, the type of the query parameter may include an on-chip read operation delay, and the numeric value corresponding to the query parameter may include a value corresponding to the on-chip read operation delay. For example, the on-chip read operation delay may be used to indicate a maximum interval between two load instructions on which reordering occurs, and the on-chip read operation delay may be used to detect whether reordering occurs on two or more load instructions in a NUMA node. A specific implementation of the on-chip read operation delay is similar to that of the foregoing on-chip write operation delay, and details are not described herein again.

It should be noted that, for example, the program includes a memory operation instruction 1 and a memory operation instruction 2, and reordering may mean that an execution order of the memory operation instruction 1 and the memory operation instruction 2 changes. For example, an order recorded in code of a program file is that the memory operation instruction 1 is executed before the memory operation instruction 2. If the program runs in a weak memory environment, due to a feature of the weak memory environment, the memory operation instruction 2 is executed before the memory operation instruction 1.

In some embodiments, memory read/write mode query may be performed based on the query parameter. The query parameter is used to describe on-chip and off-chip memory read and write delays of different cores of CPU hardware, and construct a memory read/write mode query rule.

Optionally, the query parameter may be determined based on a structure of a CPU.

Figure 4:
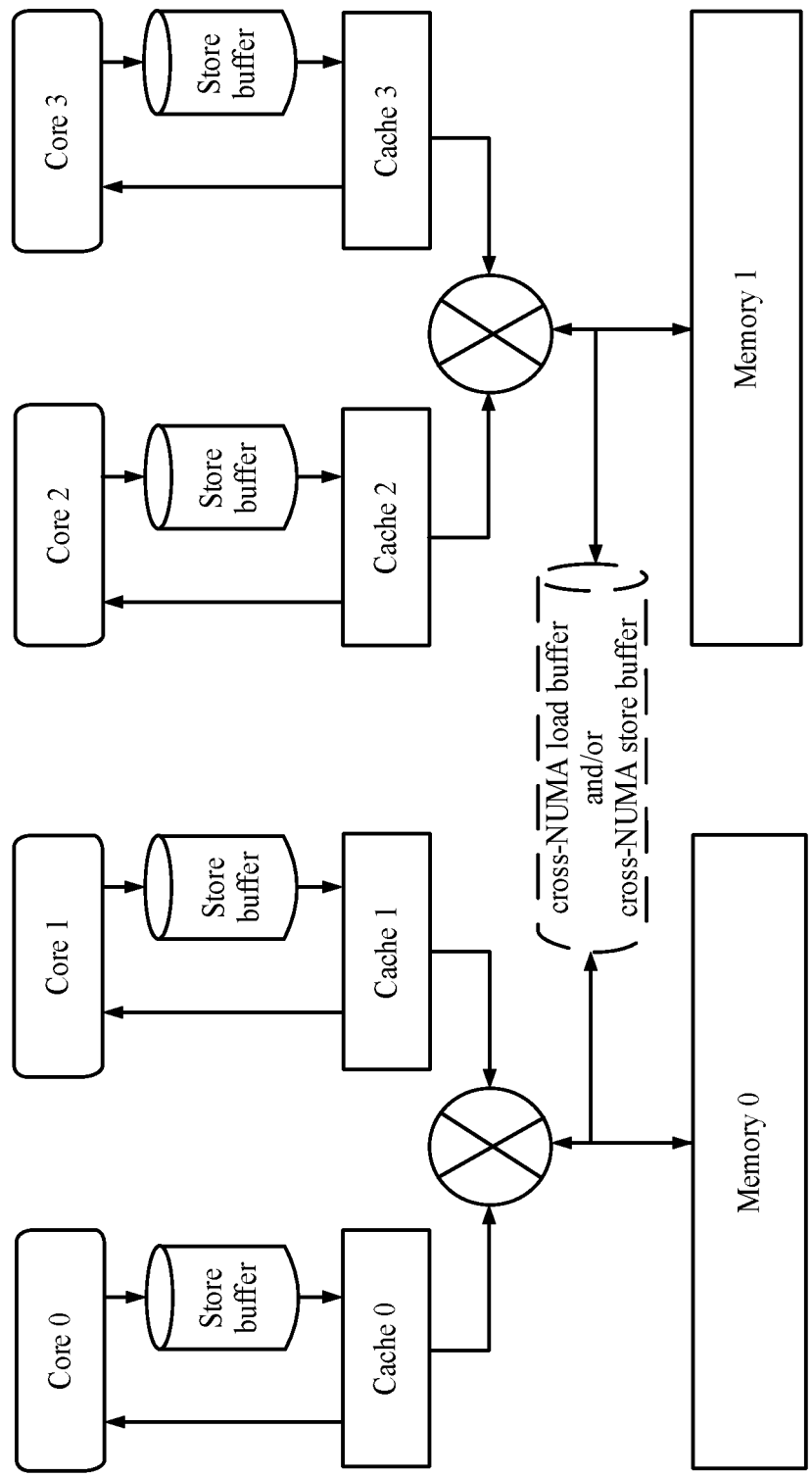
FIG. 4 is a schematic diagram 1 of a structure of a CPU according to an embodiment of this application.

FIG. 4 is a schematic diagram 1 of a structure of a CPU according to an embodiment of this application.

As shown in FIG. 4, the CPU includes two memories: a memory 0 and a memory 1, and the two memories each correspond to a core and a cache. The memory 0 corresponds to a core 0, a core 1, a cache 0, and a cache 1, a store buffer corresponds to and is between the core 0 and the cache 0, and a store buffer corresponds to and is between the core 1 and the cache 1. The memory 1 corresponds to a core 2, a core 3, a cache 2, and a cache 3, a store buffer corresponds to and is between the core 2 and the cache 2, and a store buffer corresponds to and is between the core 3 and the cache 3. Optionally, a cross-NUMA load buffer and/or a cross-NUMA store buffer corresponds to and is between the memory 0 and the memory 1. For example, the core 0 and the core 1 may perform a read operation on the memory 1 by using the cross-NUMA load buffer, and the core 0 and the core 1 may perform a write operation on the memory 1 by using the cross-NUMA store buffer. Similarly, the core 2 and the core 3 may perform a read operation on the memory 0 by using the cross-NUMA load buffer, and the core 2 and the core 3 may perform a write operation on the memory 0 by using the cross-NUMA store buffer.

With reference to FIG. 4, an architecture including the memory 0, the core 0, the core 1, the cache 0, the cache 1, and a corresponding store buffer may be referred to as a NUMA node 0. A read operation performed by the core 0 or the core 1 inside the NUMA node 0 on the memory (a memory 0) or the caches (a cache 0, a cache 1, and a corresponding store buffer) inside the NUMA node 0 is referred to as an on-chip read operation. For example, a read operation performed by the core 0 on the memory 0 is referred to as the on-chip read operation. A write operation performed by the core 0 or the core 1 inside the NUMA node 0 on the memory (a memory 0) or the caches (a cache 0, a cache 1, and a corresponding store buffer) inside the NUMA node 0 is referred to as an on-chip write operation. For example, a write operation performed by the core 0 on the memory 0 is referred to as the on-chip write operation.

Similarly, an architecture including the memory 1, the core 2, the core 3, the cache 2, the cache 3, and a corresponding store buffer may be referred to as a NUMA node 1. A read operation performed by the core 2 or the core 3 inside the NUMA node 1 on the memory (a memory 1) or the caches (a cache 2, a cache 3, and a corresponding store buffer) inside the NUMA node 1 is referred to as an on-chip read operation. For example, a read operation performed by the core 2 on the memory 1 is referred to as an on-chip read operation. A write operation performed by the core 2 or the core 3 inside the NUMA node 1 on the memory (a memory 1) or the caches (a cache 2, a cache 3, and a corresponding store buffer) inside the NUMA node 1 is referred to as an on-chip write operation. For example, a write operation performed by the core 2 on the memory 1 is referred to as an on-chip write operation.

For example, a memory operation between the NUMA node 0 and the NUMA node 1 is referred to as a cross-NUMA memory operation, and the memory operation includes a read operation and/or a write operation. For example, a read operation performed by the core 0 in the NUMA node 0 on the memory 1 in the NUMA node 1 is referred to as a cross-NUMA read operation, and a write operation performed by the core 0 in the NUMA node 0 on the memory 1 in the NUMA node 1 is referred to as a cross-NUMA write operation. Similarly, a read operation performed by the core 2 in the NUMA node 1 on the memory 0 in the NUMA node 0 is referred to as a cross-NUMA read operation, and a write operation performed by the core 2 in the NUMA node 1 on the memory 0 in the NUMA node 0 is referred to as a cross-NUMA write operation. Details are not listed herein.

For example, with reference to FIG. 4, if a CPU includes a store buffer, it may be determined that an on-chip write operation delay and/or a value corresponding to an on-chip write operation delay is used. If the CPU includes a cross-NUMA load buffer, it may be determined that a cross-NUMA write operation delay and/or a value corresponding to a cross-NUMA write operation delay is used. If the CPU includes a cross-NUMA store buffer, it may be determined that a cross-NUMA read operation delay and/or a value corresponding to a cross-NUMA read operation delay is used. Optionally, if the CPU includes a load buffer, it may be determined that an on-chip read operation delay and/or a value corresponding to an on-chip read operation delay is used. A load buffer may correspond to and is between the core 0 and the cache 0. Similarly, a load buffer may separately correspond to and is between the core 1 and the cache 1, between the core 2 and the cache 2, and between the core 3 and the cache 3 (not shown in FIG. 4).

In some embodiments, the query parameter may be determined by the program detection apparatus.

For example, the program detection apparatus may determine the type of the query parameter, for example, an on-chip write operation delay is used, or a cross-NUMA write operation delay and/or a cross-NUMA read operation delay is used.

For example, the program detection apparatus may determine the numeric value corresponding to the query parameter. For example, the program detection apparatus obtains, through measurement based on a test set, the numeric value corresponding to the query parameter. For example, the program detection apparatus may determine the value corresponding to the on-chip write operation delay, and may further determine the value corresponding to the cross-NUMA write operation delay and/or the value corresponding to the cross-NUMA read operation delay.

In some embodiments, the query parameter may be determined by the user.

With reference to FIG. 2, the program detection apparatus may analyze the program based on the query parameter determined by the user, to obtain the result of the program running in the weak memory environment.

Optionally, the user may determine the type of the query parameter.

For example, the user may enter a query parameter in a display interface of the program detection apparatus. FIG. 5 is a schematic diagram 1 of an interface of a program detection apparatus according to an embodiment of this application. With reference to (A) in FIG. 5, the user may enter, in an area for entering a query parameter on a display interface, an instruction corresponding to the query parameter. For example, an instruction StoreBuffer corresponding to an on-chip write operation delay may be entered. Optionally, an instruction NUMAStoreSize corresponding to a cross-NUMA write operation delay and/or an instruction NUMALoadSize corresponding to a cross-NUMA read operation delay may alternatively be entered.

Alternatively, for example, a display interface of the program detection apparatus may include a selection box of an on-chip write operation delay, and may further include a selection box of a cross-NUMA write operation delay and/or a selection box of a cross-NUMA read operation delay. For example, the user may select a selection box corresponding to a type of a query parameter to determine a type of a used query parameter. With reference to (B) in FIG. 5, the user may select the selection box corresponding to the on-chip write operation delay, to determine to use the on-chip write operation delay. Similarly, the user may determine to select the selection box corresponding to the cross-NUMA write operation delay, to determine to use the cross-NUMA write operation delay. If the cross-NUMA read operation delay is not used, the selection box corresponding to the cross-NUMA read operation delay may not be operated.

Optionally, the user may determine the numeric value corresponding to the query parameter.

With reference to (A) in FIG. 5 or (B) in FIG. 5, the user may enter a corresponding value in each area for entering a numeric value corresponding to a type of the query parameter. For example, the user may enter 8 in an area for entering a numeric value corresponding to an on-chip write operation delay. Similarly, 8 may be entered in an area for entering a numeric value corresponding to a cross-NUMA write operation delay, and 8 may be entered in an area for entering a numeric value corresponding to a cross-NUMA read operation delay.

It should be noted that the foregoing is merely an example provided in this embodiment of this application, and how the query parameter is determined is not limited in this embodiment of this application. For example, the type of the query parameter may be determined by the program detection apparatus, and the numeric value corresponding to the query parameter may be determined by the user. Alternatively, the type of the query parameter is determined by the user, and the numeric value of the query parameter is determined by the program detection apparatus. Alternatively, after the program detection apparatus determines the type of the query parameter and/or the numeric value corresponding to the query parameter, the user may modify the type of the query parameter and/or the numeric value corresponding to the query parameter.

In a possible design manner, the program detection method provided in embodiments of this application may further include obtaining the numeric value corresponding to the query parameter.

Optionally, the numeric value corresponding to the query parameter may be preset, and/or the numeric value corresponding to the query parameter may be provided by the user by using the area for entering a numeric value corresponding to a type of the query parameter in the display interface.

In a possible design manner, S102 may include obtaining, based on the query parameter, an interval between a first operation in a first thread of the program and a second operation in the first thread, and an interval between a third operation in a second thread of the program and a fourth operation in the second thread, the result of the program running in the weak memory environment.

Optionally, the first operation and the third operation may be a pair of read and write operations performed on a same variable, the second operation and the fourth operation may be a pair of read and write operations performed on a same variable, the first operation and the second operation are operations performed on different variables, and the third operation and the fourth operation are operations performed on different variables. For example, the variable may be a shared variable. A pair of operations may be: The first operation is a read operation on a first variable, and the third operation is a write operation on the first variable; or the first operation is a write operation on the first variable, and the third operation is a read operation on the first variable. Similarly, the second operation is a read operation on a second variable, and the fourth operation is a write operation on the second variable; or the second operation is a write operation on the second variable, and the fourth operation is a read operation on the second variable. The first variable may include a global variable, a shared variable, and the like, and the second variable may include a global variable, a shared variable, and the like.

FIG. 6 is a schematic diagram of an example of a program according to an embodiment of this application.

As shown in FIG. 6, the program includes a first thread thread 1 in line 14 and a second thread thread 2 in line 21. An interval between a write operation on a variable population (line 17) in the thread 1 and a write operation on a variable syn_flag (line 18) in the thread 1 may be calculated. An interval between a read operation on a variable syn_flag (line 23) in the thread 2 and a read operation on a variable population (line 24) in the thread 2 may be calculated. Based on the query parameter and the two intervals, the result of the program running in the weak memory environment is obtained.

In a possible design manner, the program detection method according to embodiments of this application may further include detecting, by using a memory read/write mode query rule, the first operation in the first thread of the program, the second operation in the first thread, the third operation in the second thread of the program, and the fourth operation in the second thread, to obtain the result of the program running in the weak memory environment.

For example, for specific implementations of the first operation, the second operation, the third operation, and the fourth operation, refer to the foregoing specific implementations. Details are not described herein again.

Optionally, the memory read/write mode query rule may be determined based on the query parameter, and the memory read/write mode query rule may be used to determine whether the first thread and the second thread overlap in terms of time.

With reference to FIG. 6, the thread 1 and the thread 2 in the program shown in FIG. 6 may be detected by using the memory read/write mode query rule, to obtain the result of the program running in the weak memory environment.

For example, the memory read/write mode query rule may include a read-read and write-write out-of-order query rule, and/or a read-write and write-read out-of-order query rule.

For example, the read-read and write-write out-of-order query rule may include one or more of the following conditions: A first operation instruction and a second operation instruction are two adjacent operation instructions in the first thread, the first operation instruction is a write operation instruction for the first variable, and the second operation instruction is a write operation instruction for the second variable; a third operation instruction and a fourth operation instruction are two adjacent operation instructions in the second thread, the third operation instruction is a read operation instruction for the first variable, and the fourth operation instruction is a read operation instruction for the second variable; the first operation instruction and the third operation instruction are in a contention relationship, and the second operation instruction and the fourth operation instruction are in a contention relationship; an interval between the first operation instruction and the second operation instruction is less than a sum of a value corresponding to an on-chip write operation delay and a value corresponding to a cross-NUMA write operation delay; and an interval between the third operation instruction and the fourth operation instruction is less than a value corresponding to a cross-NUMA read operation delay. In this way, the read-read and write-write out-of-order query rule may be used to check a result of a program that runs on the weak memory environment and that includes at least two threads, where one thread includes read-read operations, and the other thread includes write-write operations.

For example, the read-write and write-read out-of-order query rule may include one or more of the following conditions. A fifth operation instruction and a sixth operation instruction are two adjacent operation instructions in the first thread, the fifth operation instruction is a write operation instruction for a third variable, and the sixth operation instruction is a read operation instruction for a fourth variable; a seventh operation instruction and an eighth operation instruction are two adjacent operation instructions in the second thread, the seventh operation instruction is a read operation instruction for the third variable, and the eighth operation instruction is a write operation instruction for the fourth variable; the fifth operation instruction and the seventh operation instruction are in a contention relationship, and the sixth operation instruction and the eighth operation instruction are in a contention relationship; an interval between the fifth operation instruction and the sixth operation instruction is less than a sum of a value corresponding to an on-chip write operation delay, a value corresponding to a cross-NUMA write operation delay, and a value corresponding to a cross-NUMA read operation delay; and an interval between the seventh operation instruction and the eighth operation instruction is less than the sum of the value corresponding to the on-chip write operation delay, the value corresponding to the cross-NUMA write operation delay, and the value corresponding to the cross-NUMA read operation delay. In this way, the read-write and write-read out-of-order query rule may be used to check a result of a program that runs on the weak memory environment and that includes at least two threads, where one thread includes read-write operations, and the other thread includes write-read operations.

Specifically, the contention relationship may mean that an execution sequence of two operation instructions affects an execution result. The third variable may include a global variable, a shared variable, and the like, and the fourth variable may include a global variable, a shared variable, and the like.

A program statement that meets the foregoing memory read/write mode query rule may be determined as a dangerous statement that causes an incorrect result due to instruction out of order in the weak memory environment.

In this way, if the program meets the memory read/write mode query rule, the result is an error. For example, a weak memory order problem is prone to occur. If the program does not meet the memory read/write mode query rule, the result is correct. For example, if a result of the program running on a weak memory model platform is correct, the user does not need to repeatedly test the program, and the result of the program running in the weak memory environment can be quickly obtained.

In a possible design, the program detection method according to embodiments of this application may further include providing the result for the user. Optionally, the result may include correct. Alternatively, the result may include an error and/or the modification suggestion.

For example, a correct result may indicate that the program can run correctly in the weak memory environment, and an incorrect result may indicate that an exception such as a program crash, program exit, or an incorrect program calculation result occurs when the program runs in the weak memory environment. The modification suggestion may include location information of code that needs to be modified, for example, a code line number and/or a program file name. The modification suggestion may be used by the program detection apparatus to modify the program or the user to manually modify the program, so that the program runs correctly in the weak memory environment. In this way, the user can quickly locate a location that causes a program error in the program, quickly complete program modification, and improve program modification efficiency.

Optionally, if the result is correct, the detection result may be displayed to the user by using a display interface. If the result is an error, the detection result and/or the modification suggestion may be displayed to the user by using the display interface.

Figure 7:
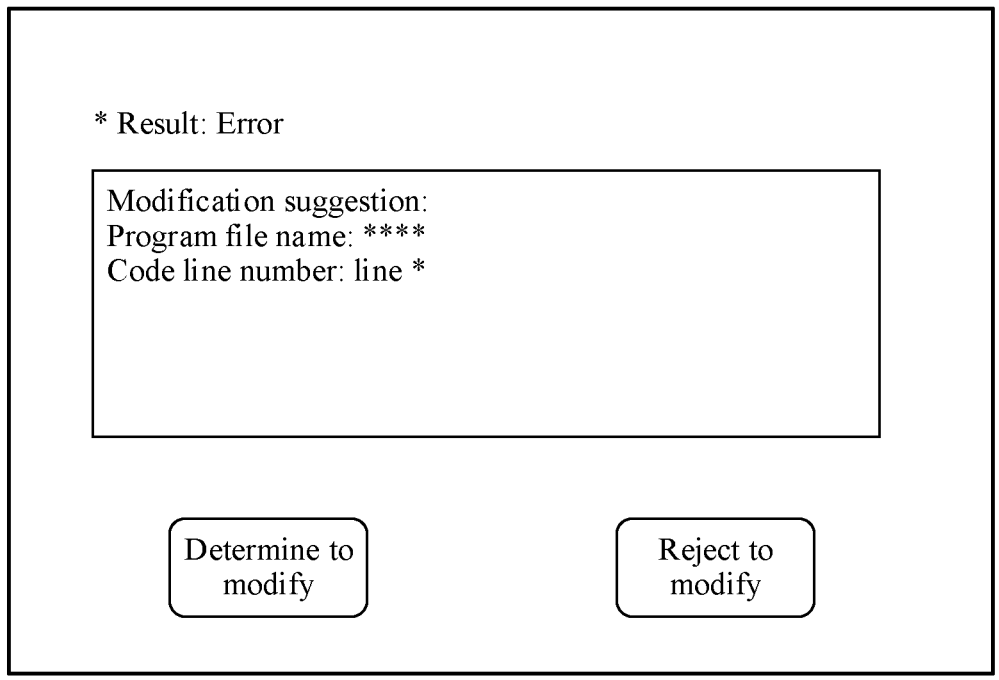
FIG. 7 is a schematic diagram 2 of an interface of a program detection apparatus according to an embodiment of this application.

FIG. 7 is a schematic diagram 2 of an interface of a program detection apparatus according to an embodiment of this application. As shown in FIG. 7, if a result is an error, that the result is an error, a corresponding program file name, an incorrect statement code line number, and the like may be displayed on a display interface.

In a possible design manner, the program detection method according to embodiments of this application may further include modifying the program according to the modification suggestion in response to a determining indication of the user.

With reference to FIG. 7, a user selects an area for determining to modify on the display interface, and then the program detection apparatus may modify the program according to the modification suggestion in response to the determining indication of the user. Alternatively, after selecting an area for rejecting to modify on the display interface, the user may manually modify the program according to the modification suggestion. This can directly help the user complete a modification on the program, and further improve the program modification efficiency.

Based on the program detection method shown in FIG. 1, the program detection apparatus receives the program provided by the user, and may obtain, based on the query parameter and the program, the result of the program running in the weak memory environment. This can help the user quickly complete a check on the program running in the weak memory environment, can improve program detection efficiency, and has low requirements on professional capabilities of the user.

In some embodiments, with reference to FIG. 3(A) or FIG. 3(B), the program detection method according to embodiments of this application may further include step 1 to step 8. The following performs description by using an example in which the program includes a first thread and a second thread.

Step 1: Analyze alias relationships of all of a plurality of variables included in the program.

Figure 8:
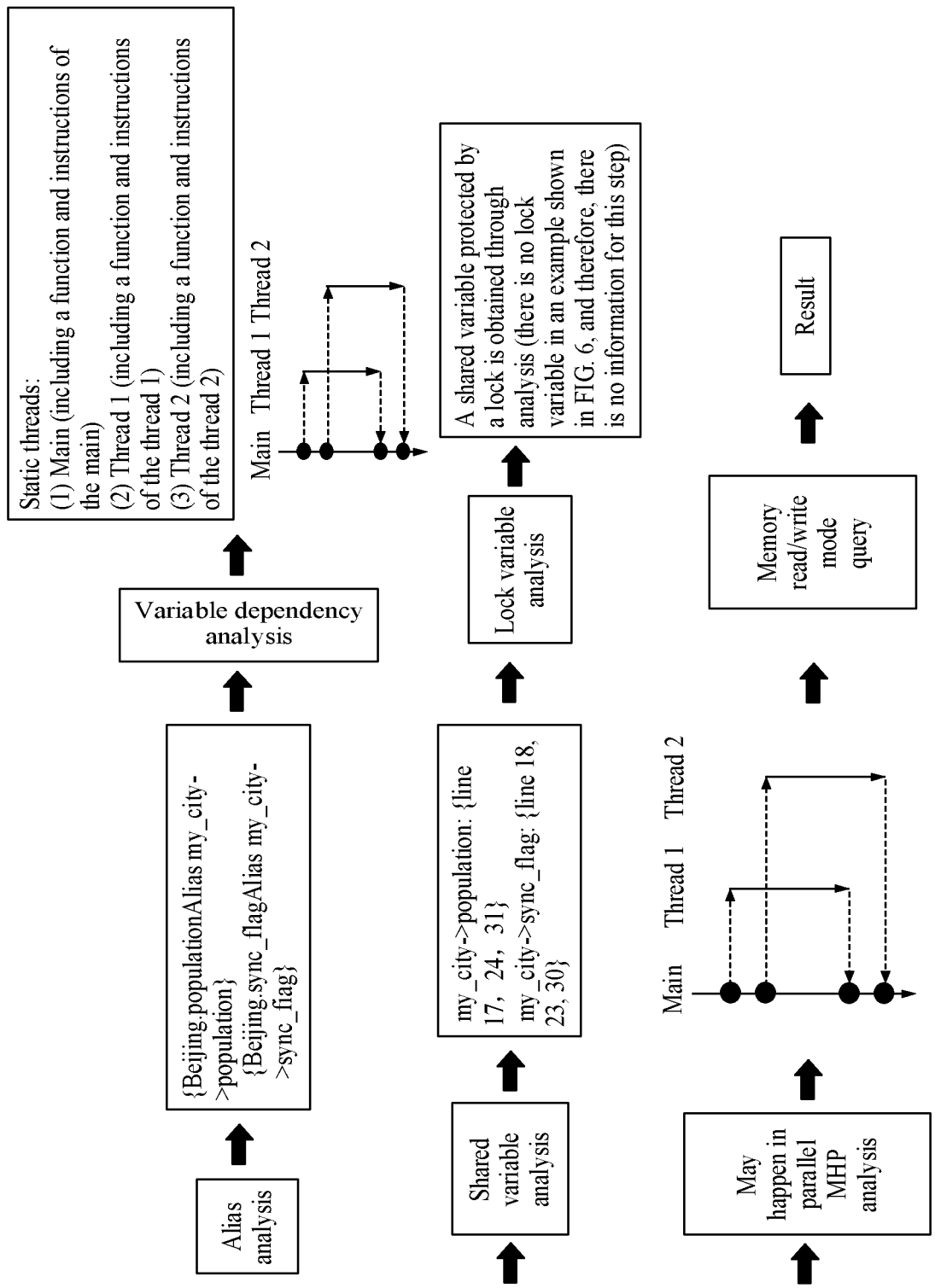
FIG. 8 is a schematic diagram 1 of an analysis example of a program according to an embodiment of this application.

With reference to FIG. 6 and FIG. 8, alias relationships of all variables in the program shown in FIG. 6 are analyzed, and the alias relationships: {Beijing. Population Alias my_city→population} and {Beijing.sync_flag Alias my_city→sync_flag} shown in FIG. 8 may be obtained.

Step 2: Perform variable dependency analysis on the program.

For example, a function relationship and a variable dependency relationship in a program provided by a user are analyzed, and a related thread relationship diagram and a function call relationship diagram are constructed. A multi-thread-related application programming interface (API) used in the program is analyzed, and a thread data structure based on a thread call context and a function call context is constructed, to distinguish contexts of different thread operations and analyze the variable dependency relationship. The multi-thread-related API may include thread-related functions such as pthread_create and pthread_mutex_lock.

With reference to FIG. 6 and FIG. 8, variable dependency analysis is performed on the program shown in FIG. 6, and a main function main (including a function and instructions of the main), a first thread thread 1 (including a function and instructions of the thread 1), and a second thread thread 2 (including a function and instructions of the thread 2) shown in FIG. 8 may be obtained.

In this way, the program is decomposed, so that a function call context of the first thread and a function call context of the second thread may be sorted out, and a thread analysis method based on the thread call context and the function call context may be implemented.

Step 3: Analyze a first variable in the program.

For example, one or more first variables in the program are analyzed, and a thread call context and a function call context accessed by each of the one or more first variables are distinguished. The first variable may be a variable included in both the first thread and the second thread. The first variable may include a shared variable, a global variable, and the like. In this way, a shared variable access point identification method based on the thread call context and the function call context can be implemented. For example, search for the shared variable may be completed based on an alias analysis algorithm, to improve efficiency, and the shared variable in the program may be analyzed by using a context encoding technology, to improve calculation accuracy.

With reference to FIG. 6 and FIG. 8, shared variable analysis is performed on the program shown in FIG. 6, and variable search results my_city→population: {line 17, 24, 31} and my_city→sync_flag: {line 18, 23, 30} shown in FIG. 8 may be obtained.

Step 4: Analyze a lock variable in the program.

For example, it is analyzed whether any statement in the program uses the lock variable. One or more mutex variables used by both the first thread and the second thread are analyzed, and a thread call context and a function call context of each of the one or more mutex variables are distinguished. The lock variable in the program may be analyzed by using the context encoding technology, to improve the calculation accuracy.

With reference to FIG. 6 and FIG. 8, lock variable analysis is performed on the program shown in FIG. 6. Because the program shown in FIG. 6 does not include the lock variable, no lock variable analysis result is included in FIG. 8.

Step 5: Analyze a possibility that program basic blocks including the first variable may happen in parallel.

For example, a possibility that each statement in each program basic block (BB) including the first variable in the program may happen in parallel (MHP) may be analyzed by using a static vector time algorithm. A vector timestamp is constructed for a program basic block that includes a read operation or a write operation and that includes the first variable, relative logical time of execution of the program basic block in the program or the thread is simulated, and a parallel analysis method based on a whole program thread call context and a function call context by using the program basic block as a granularity may be implemented.

With reference to FIG. 6 and FIG. 8, MHP analysis is performed on the program shown in FIG. 6, and a vector timestamp construction result of the first thread thread 1 and a vector timestamp construction result of the second thread thread 2 shown in FIG. 8 may be obtained. Statement execution time of the thread 1 and statement execution time of the thread 2 overlap, and therefore, statements of the thread 1 and the thread 2 may be executed in parallel.

FIG. 9 is a schematic diagram 2 of an analysis example of a program according to an embodiment of this application. FIG. 9 shows an analysis result of the program (for example, a file name of the program is weekConsistency.c) shown in FIG. 6.

As shown in FIG. 9, Note 1: ST means Static Thread (Note1: ST means Static Thread). Note 2: We precisely record the call string of each variable (Note2: We precisely record the call string of each variable). Note 3: The style of call sting is A(b)→C(d)→ . . . A means caller, b means call instruction (Note3: The style of call sting is A(b)→C(d)→ . . . A means caller, b means call instruction). Note 4: A(b)→C means that A calls C by instruction b (Note4: A(b)→C means that A calls C by instruction b).

By analyzing the program (for example, a file name of the program is weekConsistency.c) shown in FIG. 6 by using step 5, the following information may be obtained: Pairs include: A write operation on a global variable population is in the thread 1 (line 17 in the source code weekConsistency.c), and a read operation on the global variable population is in the thread 2 (line 24 in the source code weekConsistency.c). Pairs include: A write operation on a global variable sync_flag is in the thread 1 (line 18 in the source code weekConsistency.c), and a read operation on the global variable sync_flag is in the thread 2 (line 23 in the source code weekConsistency.c). A time interval between a statement in line 17 in the thread 1 and a statement in line 18 in the thread 1 and a time interval between a statement in line 23 in the thread 2 and a statement in line 24 in the thread 2 overlap, and therefore, the statement in the thread 1 and the statement in the thread 2 may be executed in parallel.

It should be noted that step 3 to step 5 are a method for analyzing the inside of a single thread, and step 3 to step 5 may be separately performed on the first thread and the second thread included in the program. A specific implementation is not limited in this application. For example, step 3 to step 5 may be first performed on the first thread, and then step 3 to step 5 are performed on the second thread. Alternatively, after step 3 is performed on the first thread, step 3 is performed on the second thread. Similarly, after step 4 is performed on the first thread, step 4 is performed on the second thread.

It should be noted that a sequence of step 3 to step 5 is not limited in this embodiment of this application. With reference to FIG. 3(B), step 3, step 4, and step 5 may be in a parallel relationship, and an execution sequence of step 3, step 4, and step 5 does not affect a corresponding execution result of each step.

Step 6: Perform memory read/write mode query on the program.

For a specific implementation of step 6, refer to the foregoing specific description in which the first operation in the first thread of the program, the second operation in the first thread, the third operation in the second thread of the program, and the fourth operation in the second thread are detected by using the memory read/write mode query rule to obtain the result of the program running in a weak memory environment. Details are not described herein again.

For example, with reference to FIG. 3(B), a statement in the program may be queried according to results of step 3 to step 5, to obtain a first statement. The first statement includes a read/write operation on a same variable, and write protection is not performed on the read/write operation on the variable. In addition, the read/write operation on the variable may be executed in parallel by both the first thread and the second thread, and the read/write operation on the variable may form a contention relationship.

With reference to FIG. 6 and FIG. 8, memory read/write mode query is performed on the program shown in FIG. 6. Because the program shown in FIG. 6 does not include a dangerous statement, a result shown in FIG. 8 may include correct.

Step 7: Obtain a result of the program running in the weak memory environment.

For example, the first statement is marked as a dangerous statement, where the dangerous statement may also be referred to as dangerous code, and a modification suggestion may be determined based on the dangerous code and an operation type included in the dangerous code. The modification suggestion may include a code line number and/or a program file name of the dangerous code, and the operation type may include a write operation or a read operation.

Step 8: Provide the result for the user.

Optionally, the result may include correct. Alternatively, the result may include an error and/or the modification suggestion. For a specific implementation of step 8, refer to the foregoing related descriptions. Details are not described herein again.

Optionally, a font color of the dangerous code may be converted to a color different from a font color of another code in the program, and is displayed to the user by using a display interface.

Figure 10:
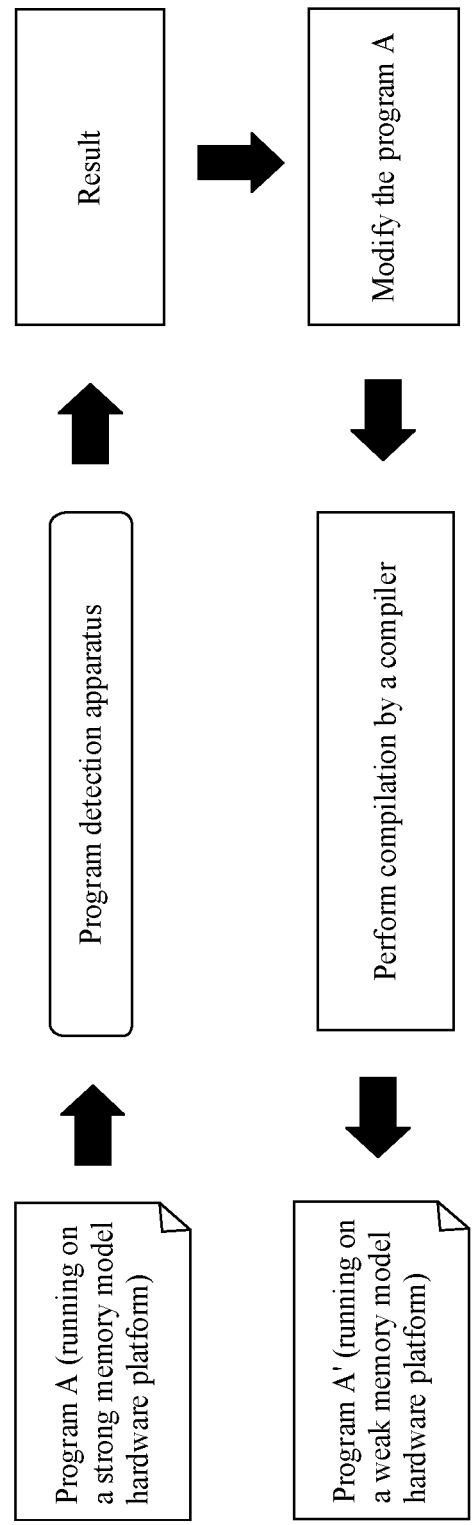
FIG. 10 is a schematic diagram 2 of application of a program detection method according to an embodiment of this application.

FIG. 10 is a schematic diagram 2 of application of a program detection method according to an embodiment of this application. As shown in FIG. 10, it is assumed that a program A provided by a user is a program running on a strong memory model platform. A program detection apparatus according to this embodiment of this application detects the program A by using the program detection method according to this embodiment of this application, to obtain a result that is an error. The user manually modifies the program A or the program detection apparatus automatically modifies the program A. For example, an existing problem is corrected by inserting a memory mask instruction. After a compiler performs compilation, an obtained program A' can run correctly on a weak memory model platform. This can improve program detection and modification efficiency.

Based on the program detection method shown in FIG. 3(A) or FIG. 3(B), a read/write operation on a global variable in the program provided by the user and a relative time sequence relationship may be statically analyzed, whether a problem exists when the program runs in the weak memory environment is obtained, a location of a faulty code can also be obtained, and the user can perform automatic or manual modification, which can improve the program detection and modification efficiency.

The foregoing describes in detail the program detection method according to embodiments of this application with reference to FIG. 1 to FIG. 10. The following describes in detail the program detection apparatus according to embodiments of this application with reference to FIG. 11 and FIG. 12.

Figure 11:
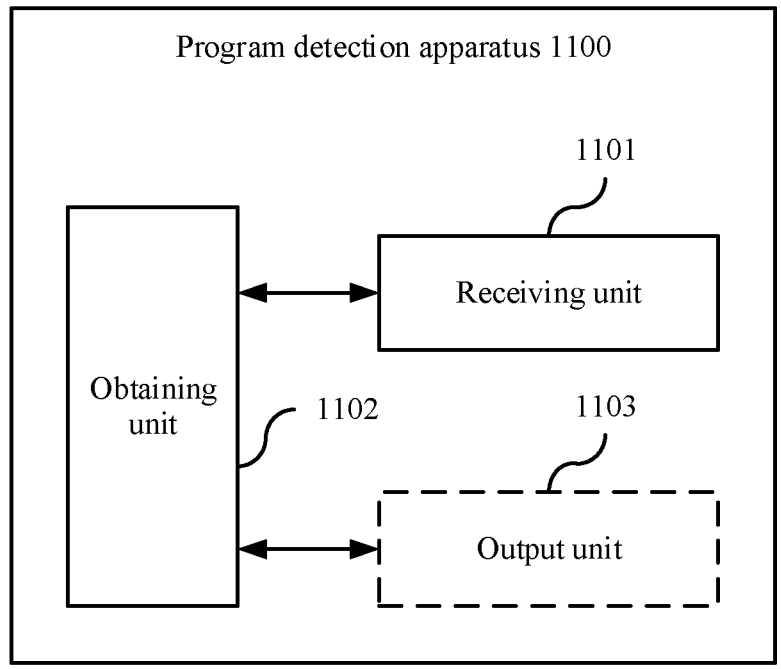
FIG. 11 is a schematic diagram 1 of a structure of a program detection apparatus according to an embodiment of this application.

FIG. 11 is a schematic diagram 1 of a structure of a program detection apparatus according to an embodiment of this application. The program detection apparatus is applicable to performing functions of the program detection apparatus in the program detection method shown in FIG. 1. For ease of description, FIG. 11 shows only main components of the program detection apparatus.

As shown in FIG. 11, the program detection apparatus 1100 includes a receiving unit 1101 and an obtaining unit 1102. The receiving unit 1101 is configured to receive a program provided by a user. The obtaining unit 1102 is configured to obtain, based on a query parameter and the program, a result of the program running in a weak memory environment. The query parameter indicates a maximum interval between two operations on which reordering occurs and that are of the program.

In a possible design manner, the obtaining unit 1102 is further configured to obtain, based on the query parameter, an interval between a first operation in a first thread of the program and a second operation in the first thread, and an interval between a third operation in a second thread of the program and a fourth operation in the second thread, the result of the program running in the weak memory environment. Optionally, the first operation and the third operation are a pair of read and write operations performed on a same variable, the second operation and the fourth operation are a pair of read and write operations performed on a same variable, the first operation and the second operation are operations performed on different variables, and the third operation and the fourth operation are operations performed on different variables.

In a possible design manner, the obtaining unit 1102 is further configured to detect, by using a memory read/write mode query rule, a first operation in a first thread of the program, a second operation in the first thread, a third operation in a second thread of the program, and a fourth operation in the second thread, to obtain the result of the program running in the weak memory environment.

Optionally, the memory read/write mode query rule may be determined based on the query parameter, and the memory read/write mode query rule may be used to determine whether the first thread and the second thread overlap in terms of time.

In a possible design manner, the memory read/write mode query rule may include a read-read and write-write out-of-order query rule, and/or a read-write and write-read out-of-order query rule.

In a possible design manner, the query parameter may be determined by the user, and the query parameter may include an on-chip write operation delay.

Optionally, the query parameter may further include a cross-NUMA write operation delay and/or a cross-NUMA read operation delay. In this way, memory read/write mode query may be performed based on the query parameter entered by the user.

In a possible design manner, the obtaining unit 1102 is further configured to obtain a numeric value corresponding to the query parameter. The numeric value corresponding to the query parameter may include a value corresponding to the on-chip write operation delay.

Optionally, the numeric value corresponding to the query parameter may further include a value corresponding to the cross-NUMA write operation delay and/or a value corresponding to the cross-NUMA read operation delay.

Optionally, the weak memory environment may be a running environment corresponding to a running device in a non-uniform memory access architecture NUMA.

In a possible design manner, the program detection apparatus 1100 may further include an output unit 1103. The output unit 1103 is configured to provide the result for the user. The result may include a modification suggestion.

Optionally, the result may include correct. Alternatively, the result may include error and/or the modification suggestion.

Optionally, the modification suggestion may include location information of code that needs to be modified, for example, a code line number and/or a program file name. The modification suggestion may be used by the program detection apparatus to modify the program, or may be used by the user to manually modify the program.

In a possible design manner, the obtaining unit 1102 is further configured to modify the program according to the modification suggestion in response to a determining instruction of the user.

In a possible design manner, the program detection apparatus 1100 may be placed in a cloud server.

It should be noted that the receiving unit 1101 and the output unit 1103 may be disposed separately, or may be integrated into one module, namely, a transceiver module (not shown in FIG. 11). A specific implementation of the receiving unit 1101 and the output unit 1103 is not specifically limited in this application.

Optionally, the program detection apparatus 1100 may further include a storage module (not shown in FIG. 11). The storage module stores a program or instructions. When the obtaining unit 1102 executes the program or the instructions, the program detection apparatus 1100 may perform functions of the program detection apparatus in the program detection method shown in FIG. 1.

It should be noted that the program detection apparatus 1100 may be a computer device, a server, or a cloud server, or may be a chip (system) or another component or assembly that may be disposed in a computer device, a server, or a cloud server. This is not limited in this application.

In addition, for technical effects of the program detection apparatus 1100 as shown in FIG. 11, refer to the technical effects of the program detection method as shown in FIG. 1. Details are not described herein again.

Figure 12:
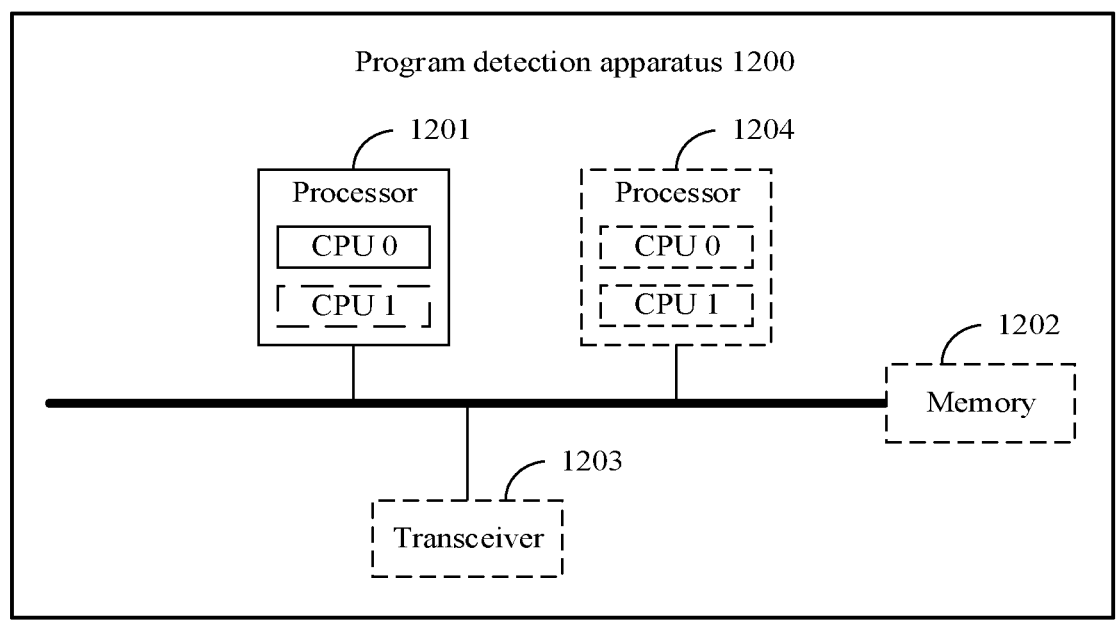
FIG. 12 is a schematic diagram 2 of a structure of a program detection apparatus according to an embodiment of this application.

FIG. 12 is a schematic diagram 2 of a structure of a program detection apparatus according to an embodiment of this application. The program detection apparatus may be a computer device, a server, or a cloud server, or may be a chip (system) or another component or assembly that may be disposed in a computer device, a server, or a cloud server. This is not limited in this application.

As shown in FIG. 12, the program detection apparatus 1200 may include a processor 1201. Optionally, the program detection apparatus 1200 may further include a memory 1202 and a transceiver 1203. The processor 1201 is coupled to the memory 1202 and the transceiver 1203, for example, may be connected to the memory 1202 and the transceiver 1203 through a communication bus.

The following describes each component of the program detection apparatus 1200 in detail with reference to FIG. 12.

The processor 1201 is a control center of the program detection apparatus 1200, and may be one processor or may be a collective term of a plurality of processing elements. For example, the processor 1201 is one or more CPUs, or may be an application-specific integrated circuit (ASIC), or is configured as one or more integrated circuits for implementing embodiments of this application, for example, one or more microprocessors (digital signal processors (DSPs)) or one or more field programmable gate arrays (FPGAs).

The processor 1201 may perform various functions of the program detection apparatus 1200 by running or executing a software program stored in the memory 1202 and invoking data stored in the memory 1202.

During specific implementation, in an embodiment, the processor 1201 may include one or more CPUs, for example, a CPU0 and a CPU1 in FIG. 12.

During specific implementation, in an embodiment, the program detection apparatus 1200 may alternatively include a plurality of processors, for example, the processor 1201 and a processor 1204 shown in FIG. 12. Each of the processors may be a single-core processor (single-CPU), or may be a multi-core processor (multi-CPU). The processor herein may be one or more devices, circuits, and/or processing cores configured to process data (for example, computer program instructions).

The memory 1202 may be a read-only memory (ROM), another type of static storage device that can store static information and instructions, a random-access memory (RAM), or another type of dynamic storage device that can store information and instructions, or may be an electrically erasable programmable ROM (EEPROM), a compact disc (CD) ROM or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that can be accessed by a computer, but is not limited thereto. The memory 1202 may be integrated with the processor 1201, or may exist independently, and is coupled to the processor 1201 through an input/output port (not shown in FIG. 12) of the program detection apparatus 1200. This is not specifically limited in this embodiment of this application.

The memory 1202 is configured to store a software program for executing the solutions of this application, and the processor 1201 controls the execution. For a specific implementation, refer to the foregoing method embodiments. Details are not described herein again.

The transceiver 1203 is configured to communicate with another device. In addition, the transceiver 1203 may include a receiver and a transmitter (not separately shown in FIG. 12). The receiver is configured to implement a receiving function, and the transmitter is configured to implement a sending function. The transceiver 1203 may be integrated with the processor 1201, or may exist independently, and is coupled to the processor 1201 through an input/output port (not shown in FIG. 12) of the program detection apparatus 1200. This is not specifically limited in this embodiment of this application.

It should be noted that the structure of the program detection apparatus 1200 shown in FIG. 12 does not constitute a limitation on the program detection apparatus. An actual program detection apparatus may include more or fewer components than those shown in the figure, or combine some components, or have different component arrangements.

An embodiment of this application provides a chip system. The chip system includes a processor and an input/output port. The processor is configured to implement a processing function in the foregoing method embodiments, and the input/output port is configured to implement a transceiver function in the foregoing method embodiments.

In a possible design, the chip system further includes a memory, and the memory is configured to store program instructions and data for implementing the functions in the foregoing method embodiments.

The chip system may include a chip, or may include a chip and another discrete component.

An embodiment of this application provides a computer-readable storage medium. The computer-readable storage medium stores computer instructions. When the computer instructions are run on a computer, the computer is enabled to perform the program detection method in the foregoing method embodiments.

An embodiment of this application provides a computer program product including instructions. The computer program product includes a computer program or instructions. When the computer program or the instructions are run on a computer, the computer is enabled to perform the program detection method in the foregoing method embodiments.

It should be understood that, the processor in embodiments of this application may be a CPU, or may be another general-purpose processor, a DSP, an ASIC, an FPGA, or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a ROM, a PROM, an erasable PROM (EPROM), an EEPROM, or a flash memory. The volatile memory may be a RAM, used as an external cache. Through an example rather than a limitative description, RAMs in many forms may be used, for example, a static RAM (SRAM), a dynamic RAM (DRAM), a synchronous DRAM (SDRAM), a double data rate (DDR) synchronous DRAM, an enhanced SDRAM (ESDRAM), a synchronous link DRAM (SLDRAM), and a direct Rambus (DR) RAM.

All or some of the foregoing embodiments may be implemented using software, hardware (for example, a circuit), firmware, or any combination thereof. When the software is used to implement embodiments, the foregoing embodiments may be implemented completely or partially in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof indicates any combination of these items, including a single item (piece) or any combination of a plurality of items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that units and algorithm steps in the examples described with reference to the embodiments disclosed in this specification can be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A program detection method, comprising:
receiving, from a user, a program running in a weak memory environment;
calculating a first interval between a first operation in a first thread of the program and a second operation in the first thread, and a second interval between a third operation in a second thread of the program and a fourth operation in the second thread, wherein the first operation and the third operation are a first pair of read and write operations performed on a first variable, wherein the second operation and the fourth operation are a second pair of read and write operations performed on a second variable, wherein the first operation and the second operation are operations performed on different variables, and wherein the third operation and the fourth operation are operations performed on different variables; and
obtaining, based on a query parameter, the first interval, the second interval, and the program, a result of the program,
wherein the query parameter indicates a maximum interval between two operations on which reordering occurs and that are of the program.

2. The program detection method of claim 1, further comprising detecting, by using a memory read/write mode query rule, the first operation, the second operation, the third operation, and the fourth operation to obtain the result.

3. The program detection method of claim 2, further comprising determining, based on the query parameter, the memory read/write mode query rule to determine whether the first thread and the second thread overlap in terms of time.

4. The program detection method of claim 1, further comprising determining, by the user, the query parameter, wherein the query parameter comprises an on-chip write operation delay.

5. The program detection method of claim 1, wherein the weak memory environment is a running environment corresponding to a running device in a non-uniform memory access architecture (NUMA).

6. The program detection method of claim 1, further comprising providing, for the user, the result, wherein the result comprises a modification suggestion.

7. The program detection method of claim 6, further comprising modifying the program according to the modification suggestion in response to a determining indication of the user.

8. A program detection apparatus, comprising:
a memory configured to store instructions; and
one or more processors coupled to the memory and configured to:
receive, from a user, a program in a weak memory environment;
calculate a first interval between a first operation in a first thread of the program and a second operation in the first thread, and a second interval between a third operation in a second thread of the program and a fourth operation in the second thread, wherein the first operation and the third operation are a first pair of read and write operations performed on a first variable, wherein the second operation and the fourth operation are a second pair of read and write operations performed on a second variable, wherein the first operation and the second operation are operations performed on different variables, and wherein the third operation and the fourth operation are operations performed on different variables; and
obtain, based on a query parameter, the first interval, the second interval, and the program, a result of the program,
wherein the query parameter indicates a maximum interval between two operations on which reordering occurs and that are of the program.

9. The program detection apparatus of claim 8, wherein the one or more processors are further configured to detect, using a memory read/write mode query rule, the first operation, the second operation, the third operation, and the fourth operation to obtain the result.

10. The program detection apparatus of claim 9, wherein the one or more processors are further configured to determine, based on the query parameter, the memory read/write mode query rule to determine whether the first thread and the second thread overlap in terms of time.

11. The program detection apparatus of claim 8, wherein the one or more processors are further configured to determine, by the user, the query parameter, and wherein the query parameter comprises an on-chip write operation delay.

12. The program detection apparatus of claim 8, wherein the weak memory environment is a running environment corresponding to a running device in a non-uniform memory access architecture (NUMA).

13. The program detection apparatus of claim 8, wherein the one or more processors are further configured to provide, for the user, the result, and wherein the result comprises a modification suggestion.

14. The program detection apparatus of claim 13, wherein the one or more processors are further configured to modify the program according to the modification suggestion in response to a determining indication of the user.

15. A computer program product comprising computer-executable instructions that are stored on a non-transitory computer storage medium and that, when executed by one or more processors, cause a program detection apparatus to:
receive, from a user, a program running in a weak memory environment;
calculate a first interval between a first operation in a first thread of the program and a second operation in the first thread, and a second interval between a third operation in a second thread of the program and a fourth operation in the second thread, wherein the first operation and the third operation are a first pair of read and write operations performed on a first variable, wherein the second operation and the fourth operation are a second pair of read and write operations performed on a second variable, wherein the first operation and the second operation are operations performed on different variables, and wherein the third operation and the fourth operation are operations performed on different variables; and
obtain, based on a query parameter, the first interval, the second interval, and the program, a result of the program,
wherein the query parameter indicates a maximum interval between two operations on which reordering occurs and that are of the program.

16. The computer program product of claim 15, wherein the computer-executable instructions, when executed by the one or more processors, further cause the program detection apparatus to detect, using a memory read/write mode query rule, the first operation, the second operation, the third operation, and the fourth operation to obtain the result.

17. The computer program product of claim 16, wherein computer-executable instructions, when executed by the one or more processors, further cause the program detection apparatus to determine, based on the query parameter, the memory read/write mode query rule to determine whether the first thread and the second thread overlap in terms of time.

18. The computer program product of claim 16, wherein computer-executable instructions, when executed by the one or more processors, further cause the program detection apparatus to determine, by the user, the query parameter, and wherein the query parameter comprises an on-chip write operation delay.

19. The computer program product of claim 16, wherein the weak memory environment is a running environment corresponding to a running device in a non-uniform memory access architecture (NUMA).

20. The computer program product of claim 16, wherein computer-executable instructions, when executed by the one or more processors, further cause the program detection apparatus to provide, for the user, the result, and wherein the result comprises a modification suggestion.

* * * * *